United States Patent [19]

Botnick

[11] Patent Number: 4,545,533

[45] Date of Patent: Oct. 8, 1985

[54] ABLUTION FAUCET

[75] Inventor: Irlin H. Botnick, Pepper Pike, Ohio

[73] Assignee: Josam Developments, Inc., Cleveland, Ohio

[21] Appl. No.: 408,449

[22] Filed: Aug. 16, 1982

[51] Int. Cl.[4] ............................................. B05B 15/06
[52] U.S. Cl. .................................. 239/282; 137/853; 239/572; 239/583; 251/323
[58] Field of Search ..................... 137/360, 853, 859; 239/282, 530, 572, 577, 583; 251/78, 251, 322, 323, 107

[56] References Cited

U.S. PATENT DOCUMENTS

| D. 162,655 | 3/1951 | Heydt | D23/35 |
|---|---|---|---|
| 192,728 | 7/1977 | Bailey | 239/282 |
| D. 212,535 | 10/1968 | Barker | D23/01 |
| D. 224,834 | 9/1972 | Landell | D23/01 |
| D. 228,908 | 10/1973 | Juhlin | D23/01 |
| D. 237,708 | 11/1975 | Grohe | D23/35 |
| D. 243,609 | 3/1977 | Mono et al. | D23/01 |
| D. 253,069 | 10/1979 | Ogilvie | D23/35 |
| 3,130,749 | 4/1964 | Wittren | 251/251 |
| 824,527 | 6/1906 | Colina | 251/251 |
| 964,804 | 7/1910 | Parker . | |
| 1,168,933 | 1/1916 | Burkley et al. | 251/251 |
| 2,008,449 | 7/1935 | Hladik | 251/251 |
| 2,187,581 | 1/1940 | Young | 277/20 |
| 2,364,491 | 12/1944 | Triadou | 299/144 |
| 2,663,309 | 12/1953 | Fillivng | 137/853 |
| 2,899,169 | 8/1959 | Klingler | 251/107 |
| 2,989,283 | 6/1961 | Klingler | 251/86 |
| 3,468,344 | 9/1969 | Sanford | 137/636.4 |
| 3,637,143 | 1/1972 | Shames | 239/283 |
| 3,662,407 | 5/1972 | Colucci | 4/7 |
| 3,788,352 | 1/1974 | AnACL/e/ et al. | 251/251 |
| 3,948,285 | 4/1976 | Flynn | 239/570 |
| 3,952,770 | 4/1976 | Botnick | 137/360 |
| 4,000,742 | 1/1977 | DiGlacomo | 128/229 |
| 4,171,169 | 10/1979 | Williams | 401/41 |
| 4,286,616 | 9/1981 | Botnick . | |

FOREIGN PATENT DOCUMENTS

| 297603 | 3/1954 | Switzerland | 251/251 |
|---|---|---|---|
| 597854 | 10/1976 | Switzerland | 239/282 |

Primary Examiner—Andres Kashnikow
Assistant Examiner—Daniel R. Edelbrock
Attorney, Agent, or Firm—Porter & Bremer Co.

[57] ABSTRACT

An ablution faucet includes a wall-mounted control valve and a flexible conduit having a hand-held control unit at the end thereof. The hand-held control unit includes a body portion from which a nozzle projects, and a lever for controlling the flow of water through the nozzle. The body portion includes a piston which is always urged into engagement with a valve seat by water pressure and a piston-actuating member engageable by the lever. Various alternative embodiments of the piston and piston-actuating member are disclosed. The wall-mounted control valve also includes a piston which is biased to a valve-closed position by water pressure, as well as a vacuum breaker. An alternative embodiment of the invention employs a cable disposed within the hose and connected in valve-actuating relationship between the lever and the wall-mounted control valve. With this embodiment of the invention, actuation of the lever actuates the wall-mounted control valve, thereby avoiding the need for manually controlling the wall-mounted control valve.

7 Claims, 20 Drawing Figures

ABLUTION FAUCET

CROSS REFERENCE TO RELATED APPLICATION AND PATENT

CLOSURE-ASSISTED CARTRIDGE-TYPE FLOW CONTROL VALVE, U.S. patent application Ser. No. 408,448, filed Aug. 16, 1982 by I. H. Botnick, here the "Cartridge Valve Application," the disclosure of which is incorporated herein by reference.

NON-FREEZE WALL HYDRANT WITH VACUUM BREAKER, U.S. Pat. No. 3,952,770, issued Apr. 27, 1976 to I. H. Botnick, here the "Vacuum Breaker Patent," the disclosure of which is incorporated herein by reference.

BACKGROUND OF THE INVENTION

1. Field of the Invention

The invention relates to ablution faucets and, more particularly, to an ablution faucet having a hand-held control unit which is always biased to a valve-closed position and which enables the flow of water to be easily modulated.

2. Description of the Prior Art

Although wall-mounted hygenic devices such as ablution faucets have been provided previously, these prior devices have failed to address certain considerations. It is important in a personal hygiene device such as an ablution faucet that the hand-held portion of the faucet be comfortable and include valve-actuating components which are easy to manipulate. It is important that the flow of water can be modulated from a slow rate to a rapid rate in a uniform, precisely controllable manner. Prior ablution faucets have not been able to control the flow of water in a uniform, predictable manner. It also is desirable that different nozzle configurations be made available so as to provide for different requirements of individual users. Prior ablution faucets have not been particularly easy to manipulate, and the configuration of the hand-held portions of the faucets, coupled with the types of nozzles available, has limited the usefulness of the devices.

In order to relieve water pressure in flexible hoses during periods of non-use and in order to prevent the hand-held unit from leaking, wall-mounted control valves have been provided to shut off the flow of water to the hand-held portion of the faucet. Although wall-mounted shut off valves are known, prior shut off valves have tended to leak, obviously an undesirable result. Moreover, prior wall-mounted control valves have not provided an integral vacuum breaker feature as commonly is required by plumbing codes.

Yet an additional difficulty with prior wall-mounted control valves has been the need to turn the valve off manually after the ablution faucet has been used. Desirably, an ablution faucet would include a wall-mounted control valve which would automatically assume a non-flow conducting position whenever a hand-held control valve is moved to a non-fluid-conducting position. In short, it would be a very desirable feature for an "upstream" control valve to be shut off (thereby relieving pressure in the hose) whenever a hand-held control valve is shut off. By this approach, the task of shutting off the wall-mounted control valve would be eliminated, and there would be no chance that the hose could burst due to high water pressure inadvertently being maintained in the hose for an extended period of time.

SUMMARY OF THE INVENTION

In response to the foregoing considerations, the present invention provides a new and improved ablution faucet wherein a hand-held control valve is provided at the end of a flexible hose, which, in turn, extends outwardly of a wall-mounted control valve. The hand-held valve is contoured so as to be particularly easy to maneuver, and a variety of nozzles may be used with the hand-held valve unit to provide for the requirements of various individuals who may use the ablution faucet. The hand-held valve includes a piston always biased toward a valve-closed position by water pressure, a piston-actuating member, and a lever engageable with the piston-actuating member. In a preferred embodiment of the invention, the piston-actuating member includes a beveled surface engageable with a beveled surface included as part of the piston. Upon actuating the lever, the beveled surfaces slide relative to each other and the piston is smoothly moved to a valve open position. These elements permit the flow of water to be modulated with great accuracy and convenience. Because the piston is always urged by water pressure to a valve closed position, the valve will not leak. Moreover, the lever cannot apply valve-closing forces to the piston and, therefore, the valve seat cannot become prematurely worn out due to the imposition of operator-applied forces.

The wall-mounted control valve also employs water pressure to bias components toward a valve-closed position. The wall-mounted control valve includes a cartridge insertable into, and removable from, the remainder of the valve structure. The cartridge includes a valve seat and a displaceable piston having an elastomeric valve seat at one end engageable with the valve seat. At the other end, the piston includes a drive surface against which a rotatable drive member is engaged. In a preferred embodiment, relatively movable portions of the cartridge include a cam surface and a cam follower. The cam surface is contoured so that the piston is permitted to be advanced toward a valve-closed position upon rotation of the drive member, but the last portion of piston travel prior to valve closure is only under the influence of fluid forces, gravity and inertia. As with the hand-held valve, operator-applied forces cannot be applied to the piston so as to prematurely wear out the valve seat.

In addition to the cartridge construction referred to, the wall-mounted control valve includes a vacuum breaker operable to prevent a reverse flow of water through the wall-mounted control valve from the hose. The vacuum breaker includes an annular chamber within which primary and secondary pistons are axially movable. An elastomeric boot surrounds the pistons and is movable therewith from a position permitting water flow through the spider outwardly into the hose. In a second position, the boot is retracted and diverts reversely flowing water from the hose outwardly from the wall-mounted control valve to atmosphere. The cartridge construction and the vacuum breaker construction referred to are substantially similar to those disclosed in the Cartridge Valve Application and the Vacuum Breaker Patent.

An alternative embodiment of the invention employs a wall-mounted control valve in valve-actuating relationship with the hand-held valve unit. With this embodiment of the invention, actuation of the lever actuates the wall-mounted control valve, thereby avoiding the need for manually controlling the wall-mounted control valve. In this embodiment of the invention, a hollow, flexible cable is disposed within the hose and is connected at one end with a piston-actuating member in the hand-held valve unit and, at the other end, is connected to a piston in the wall-mounted control valve. Upon depressing the lever, the cable is moved axially within the hose and moves the piston upstream against water pressure to a valve open position. Water flows through the hose and within the cable for discharge through the hand-held valve unit. Upon releasing the valve, water pressure forces the piston in the wall-mounted control valve to a valve closed position. This embodiment of the invention also employs a vacuum breaker operating similarly to the vacuum breaker disclosed in the Vacuum Breaker Patent.

DESCRIPTION OF THE PREFERRED EMBODIMENT

Figure 1:
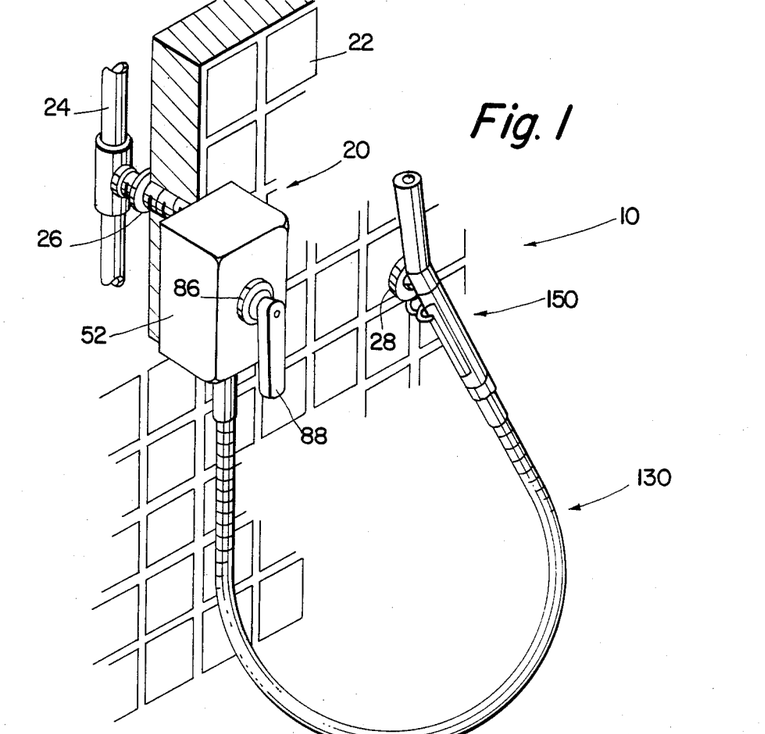
FIG. 1 is a perspective view of an ablution faucet according to the invention in which a manually operated, wall-mounted control valve is used.

Referring to FIG. 1, an ablution faucet according to the invention is indicated generally by the reference numeral 10. The faucet 10 includes a wall-mounted control valve 20, a flexible hose 130 for conducting water, and a hand-held valve unit 150 for controlling the discharge of water from the hose 130 and for directing the flow of water for hygienic purposes. The valve 20 is mounted to a wall 22 and receives a supply of water from a water supply pipe 24 having a branch line 26. The hand-held valve unit 150 may be secured to the wall 22 during periods of non-use by means of a wall-mounted hook 28.

Figure 17:
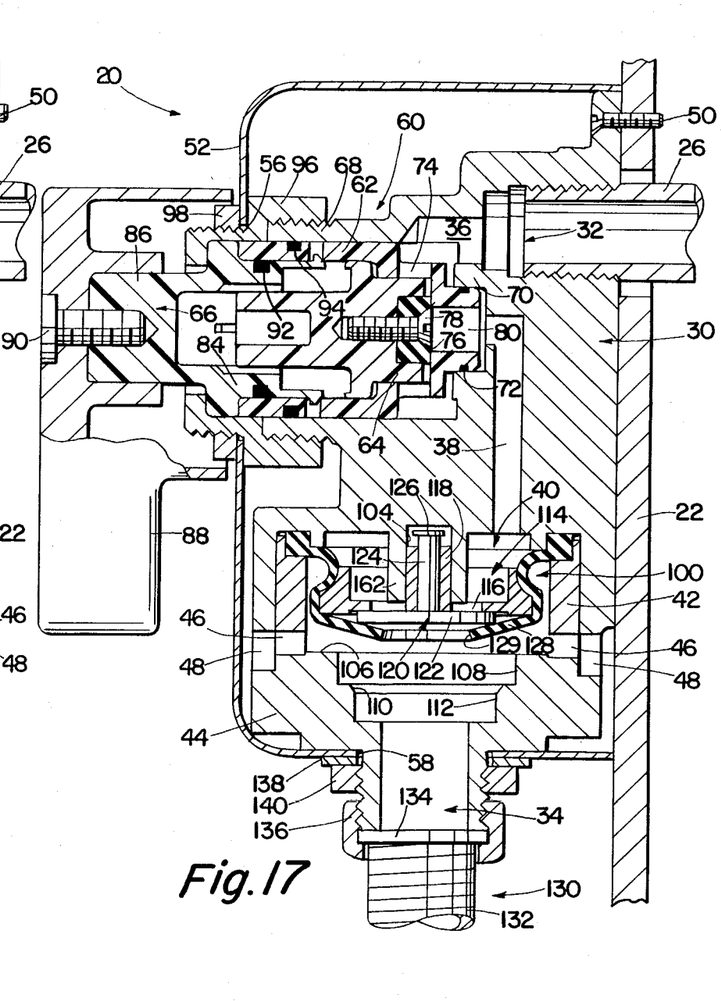
FIGS. 17 and 18 are cross-sectional views of the wall-mounted control valve of FIG. 1 in, respectively, a valve-closed and valve-open position.
Figure 18:
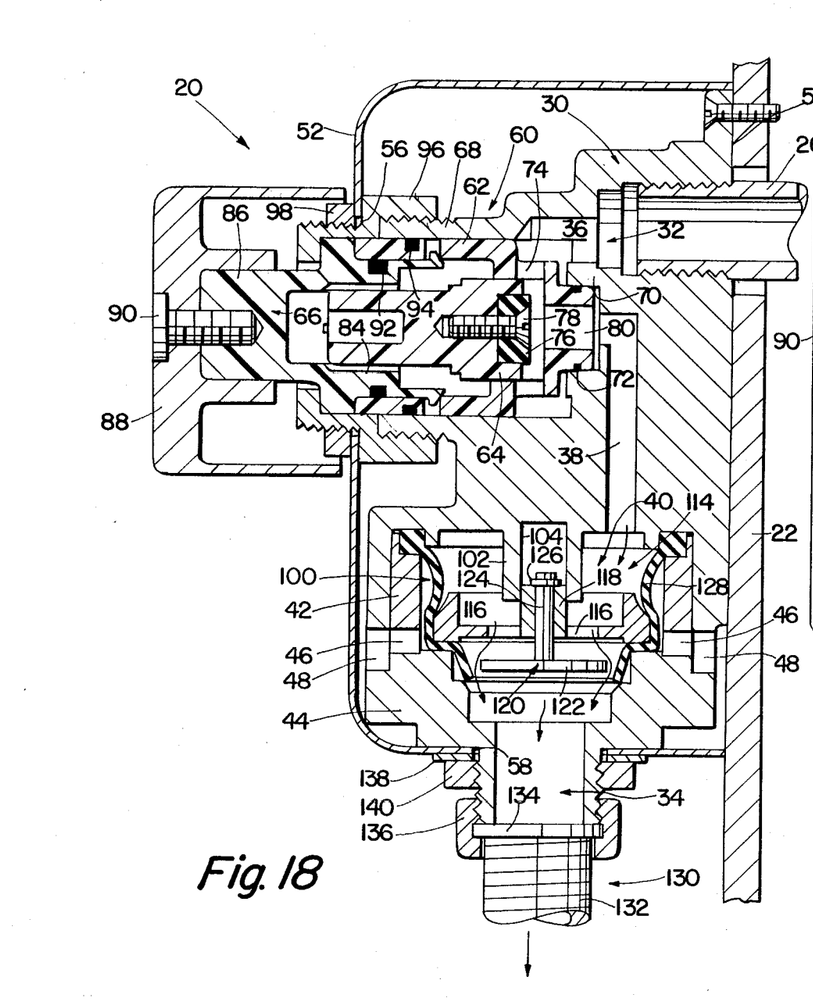

Referring to FIGS. 17 and 18, the wall-mounted valve 20 is shown, respectively, in a valve-closed and a valve-open position. The wall-mounted valve 20 incorporates important features from the Cartridge Valve Patent and the Vacuum Breaker Patent. The valve 20 includes a body portion 30 formed of a one-piece brass casting. The body portion 30 includes an inlet indicated generally by the reference numeral 32, and an outlet indicated generally by the reference numeral 34. A cartridge-type valve 60 in accordance with the Cartridge Valve Application is included with the body portion 30, and a vacuum breaker 100 in accordance with the Vacuum Breaker Patent also is included with the body portion 30. The body portion 30 additionally includes an annular chamber 36 for receiving water from the inlet 32. The valve 60 is in fluid communication with the annular chamber 36. An outlet passageway 38 conveys valved fluid to the vacuum breaker 100. The vacuum breaker 100 is positioned in an annular chamber 40 in communication with the passageway 38. A vent ring 42 is positioned within the chamber 40 and an outlet housing 44 is secured to the body portion 30. The housing 44 defines a portion of the fluid outlet 34. Air ports 46 formed in the vent ring 42 are in communication with the annular chamber 40 when the vacuum breaker 100 is in a valve-closed position. Air ports 48 formed in the housing 44 are in communication with the ports 46 and the atmosphere. The ports 46, 48 therefore permit the fluid outlet 34 to communicate with the atmosphere upon the occurrence of a vacuum condition existing in the fluid supply.

The body portion 30 is attached to the wall 22 by means of a plurality of screws 50 (only one of which is shown in FIGS. 17 and 18). The pipe 24 is connected to the fluid inlet 32 by means of the pipe 26 which is threaded into the fluid inlet 32. A cover 52 is provided for the valve 20. The cover 52 is a generally box-like structure having an opening 56 through which control elements of the valve 20 extend, and an opening 58 at its bottom by which the hose 130 can be connected to the fluid outlet 34.

The valve 60 includes a cartridge, or housing 62, a piston 64 axially movable within the housing 62, and a drive member 66 engageable with the piston 64. An outwardly extending receptacle 68 included as part of the body portion 30 receives the housing 62. A rim 70 provides a transition between the annular chamber 36 and the outlet 38 and also provides a place against which a seal can be formed relative to the housing 62. The seal is provided by an O-ring 72 located at the end of the housing 62 and which engages the inner surface of the rim 70 in a fluid-tight relationship. A plurality of openings 74 provide fluid communication between the chamber 36 and the interior of the housing 62.

As is described in more detail in the Cartridge Valve Application, the piston 64 nests within the housing 62 and is supported for axial, as well as rotational movement therein. The end of the piston 64 carries a sealing member in the form of a washer 76 held in place by means of a fastener 78. The washer 76 engages a flat inner surface of the housing 62 so as to provide a valving capability. An opening 80 in the end of the housing 62 provides fluid communication between the interior of the housing 62 and the outlet 38.

The drive member 66 includes a base portion 84 engageable with the piston 64. A drive stem 86 projects from the base portion 84. The drive stem 86 is rectangular in cross-section to provide a driving relationship with a control lever 88. A threaded fastener 90 secures the control lever 88 to the end of the drive stem 86. An O-ring 92 provides a fluid-tight seal between the drive member 66 and the inner surface of the housing 62. An O-ring 94 provides a fluid-tight seal between the outer surface of the housing 62 and the inner surface of the receptacle 68. In order to retain the cartridge 60 in place within the receptacle 68, a nut 96 is threadly secured to the upper end of the receptacle 68. The nut 96 contains the upper portion of the drive member 66. The nut 96 also is threaded on a portion of its outer surface. A nut 98 is threaded about the nut 96 and engages the cover 52 to help retain the cover 52 in place.

The vacuum breaker 100 includes a post 102 extending centrally within the chamber 40 and having an opening 104 therein. The housing 44 is located adjacent the annular chamber 40 and defines a portion of the outlet 34. The housing 44 includes a flat, annular end face 106, a cylindrical bore 108, a tapered shoulder 110, and a cylindrical bore 112 smaller in diameter than the bore 108.

A primary piston 114 having openings 116 and a cylindrical projection 118 located at its center is disposed within the vent ring 42. The projection 118 has a slip fit within the opening 104. A secondary piston 120 in the form of a disc 122 having a stem 124 is carried by the primary piston 114. The stem 124 fits within the projection 118 and is retained in place by a snap ring 126. Depending on the position of the disc 122 relative to the openings 116, the secondary piston 120 either will permit fluid to flow through the annular chamber 40 and outwardly through the fluid outlet 34 (FIG. 18), or will close off the openings 116 and will prevent the flow of fluid (FIG. 17).

A cylindrical, elastomeric boot 128 is held in place within the chamber 40 by the vent ring 42. The primary piston 114 and the secondary piston 120 are disposed within, and are constrained by, the boot 128. The boot 128 includes a small opening 129 adjacent the disc 122. When water is not flowing through the passageway 38 (as when the valve 20 is closed or a vacuum condition exists in the water supply), the boot 128 urges the secondary piston 120 and the primary piston 114 upwardly as viewed in FIG. 17 to a closed position. When water is flowing through the passageway 38, the pressure of the water urges the secondary piston 120 and the primary piston 114 downwardly as viewed in FIG. 18. In the position shown in FIG. 18, the primary piston 114 clamps the boot 128 against the end face 106 so as to provide a fluid-tight seal. The pressure of the water urges the disc 122 away from the openings 116 and, due to the flexibility of the boot 128 adjacent the opening 129, water can flow around the disc 122, past the shoulder 110, and outwardly through the fluid outlet 34.

The hose 130 includes a flexible section 132 which may be formed of a plastics material, rubber, flexible metal or any other suitable substance as is well known. One end of the hose 130 is provided with a flange 134 and a nut 136 for connection to the housing 44. A metal washer 138 is compressed against the underside of the cover 52 by a nut 140 to help secure the cover 52 relative to the housing 44. The other end of the flexible section 132 is provided with a flange 142. A nut 144 is fitted over the flexible section 132 and engages the flange 142 to secure the flexible section 132 against the end of the hand-held unit 150.

Figure 2:
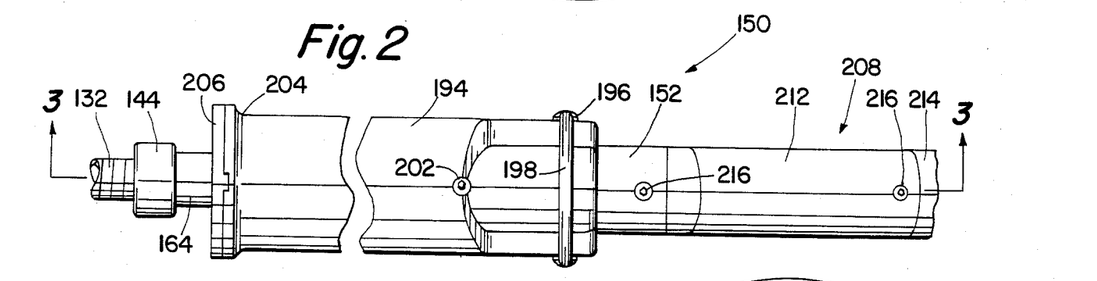
FIG. 2 is a plan view of a hand-held valve unit according to the invention.
Figure 3:
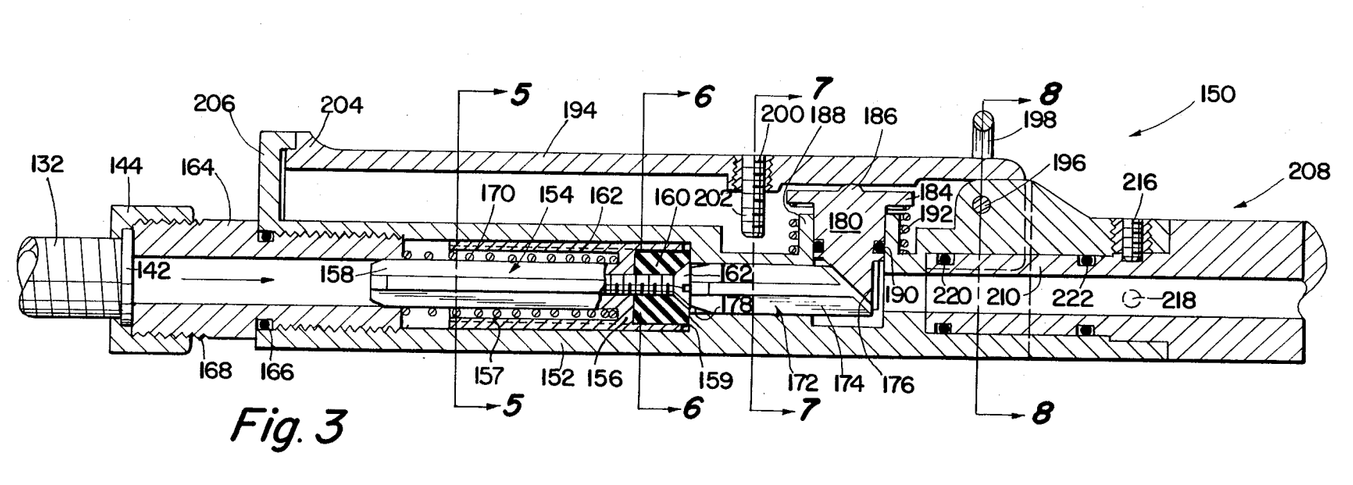
FIG. 3 is a view taken along a plane indicated by line 3—3 in FIG. 2.

Referring particularly to FIGS. 2-8, the handheld valve unit 150 includes an elongate, generally cylindrical body portion 152 (FIG. 3). Preferably, the body portion 152 as with the other components of the unit 150, is formed from a readily moldable plastics material such as that sold under the trademark CELCON. A piston 154 is disposed within the body portion 152. The piston includes an enlarged head 156, a cylindrical portion 157, and a plurality of axially extending ribs 158 concentrically disposed within the cylindrical portion 157. A plurality of axially extending ribs 159 are formed on the outer surface of the portion 157 and extend forwardly of the head 156. The piston 154 extends "upstream" so that the back face of the head 156 is exposed to water pressure from the hose 130. A sealing member in the form of a washer 160 is connected to the head 156 and is fitted within the ribs 159 to carry out a valving function. The sealing member 160 is held in place by means of a fastener 162. The rib portions 159 snugly engage the inner surface of the body portion 152 so as to provide a smooth back-and-forth motion for the piston 154. The piston 154 is held in place within the body portion 152 by a cylindrical hose fitting 164. The fitting 164 is threaded into the end of the body portion 152. An O-ring 166 is provided to establish a fluid-tight seal between the fitting 164 and the body portion 152. The outer surface of the fitting 164 is threaded as at 168 in order for the nut 144 to be secured to the fitting 164. A spring 170 is disposed within the cylindrical portion 157 and about the ribs 158. The spring is compressed intermediate the head 156 and the end face of the fitting 164. The spring 170, in combination with water pressure flowing through the fitting 164, always tends to bias the piston 154 to a valve-closed position. The use of the spring 170 is considered optional, and it is believed that the invention will function properly without the use of the spring 170.

In order to actuate the piston 154 and thereby establish a flow of water through the valve unit 150, a slide block 172 is provided. The slide block 172 is an elongate structure having a plurality of axially extending ribs 174 and a beveled end surface 176. One of the ribs 174 is larger than the others (FIG. 7) and slides in a groove 177 formed in the body portion 152. This construction prevents the slide block 172 from rotating about its longitudinal axis. The other end of the slide block 172 is tapered as indicated at 178 and engages the end surface of the fastener 162. In order to actuate the slide block 172, a second piston 180 (oriented vertically in FIGS. 3 and 4) is provided. The piston 180 includes a beveled end surface 182 engageable with the beveled end surface 176 of the slide block 172. The piston 180 also includes a flanged portion 184 and a rounded projection 186. The piston 180 is received in a receptacle 188 projecting from the body portion 152. An O-ring 190 is provided to establish a fluid-tight seal between the piston 180 and the receptacle 188. A spring 192 is disposed outside the receptacle 188 and engages the underside of the flanged portion 184 and the body portion 152. The spring 192 constantly biases the piston 180 so as to attempt to disengage the beveled end surfaces 176, 182.

In order to actuate the piston 180, a lever 194 is provided. In cross section (FIGS. 5-7), the lever is channel-shaped. One end of the lever is pinned to the body portion 152 by means of a rivet 196. A bail 198 also is pinned by the rivet 196. The bail 198 may be used to secure the valve unit 150 to the wall-mounted hook 28. The lever 194 includes a threaded opening 200 near its mid-point. A set screw 202 is threaded into the opening 200. By appropriate adjustment of the set screw 202, the extent to which the lever 194 can be rotated can be controlled. The end of the lever 194 remote from the rivet 196 is enlarged as at 204 for engagement with an upstanding portion 206 extending outwardly of the body portion 152. The upstanding portion 206 engages the enlarged portion 204 to control the extent to which the lever 194 can be pivoted clockwise as viewed in FIGS. 3 and 4.

A nozzle 208 is provided for the body portion 152. The nozzle 208 includes a reduced-diameter portion 210 disposed within the body portion 152, an enlarged-diameter portion 212 having the same outer diameter as the outer diameter of the body portion 152 at its end, and an end piece 214 (only a portion of which is shown in FIG. 2). The body portion 152 includes a pair of set screws 216, 218 at its end. The set screws are positioned at right angles to each other and engage the reduced-diameter portion 210 so as to securely hold the nozzle 208 in place. Although a number of different techniques are available to secure the nozzle 208 to the body portion 152, the use of the two set screws 216, 218 is a particularly effective technique. A pair of O-rings 220, 222 are included as part of the reduced diameter portion 210 and provide a sealing engagement between the reduced-diameter portion 210 and the inner diameter of the body portion 152. It is expected that differently configured nozzles 208 and end pieces 214 will be provided to suit the needs of individual users. The use of the set screws 216, 218 and the O-rings 220, 222 will permit different nozzles 208 to be quickly substituted while, at the same time, providing a secure, water-tight seal at the end of the hand-held unit 150.

OPERATION

The invention is operated as follows:

(1) The hand-held unit 150 is removed from the hook 28 and the handle 88 is turned to the "on" position.

(2) Upon turning the handle 88 to the "on" position, the drive member 66 is rotated and the piston 64 is moved to that position shown in FIG. 18. Water flows from the chamber 36, past the piston 64, into the passageway 38, and into the chamber 40.

(3) Water entering the chamber 40 passes through the openings 116 in the primary piston 114, engages the disc 122 and urges it away from the openings 116, and displaces the primary piston 114 and the boot 128 to that position shown in FIG. 18. A seal is established between the boot 128 and the housing 44 and water flows past the disc 122 and into the fluid outlet 34.

(4) Water from the outlet 34 flows into the flexible section 132 of the hose 130 and into the fitting 164. Because the spring 170 always urges the piston 154 toward a valve-closed position, the flow of water will be stopped when it reaches the head 156 while the hand-held unit 150 is in the "off position."

Figure 4:
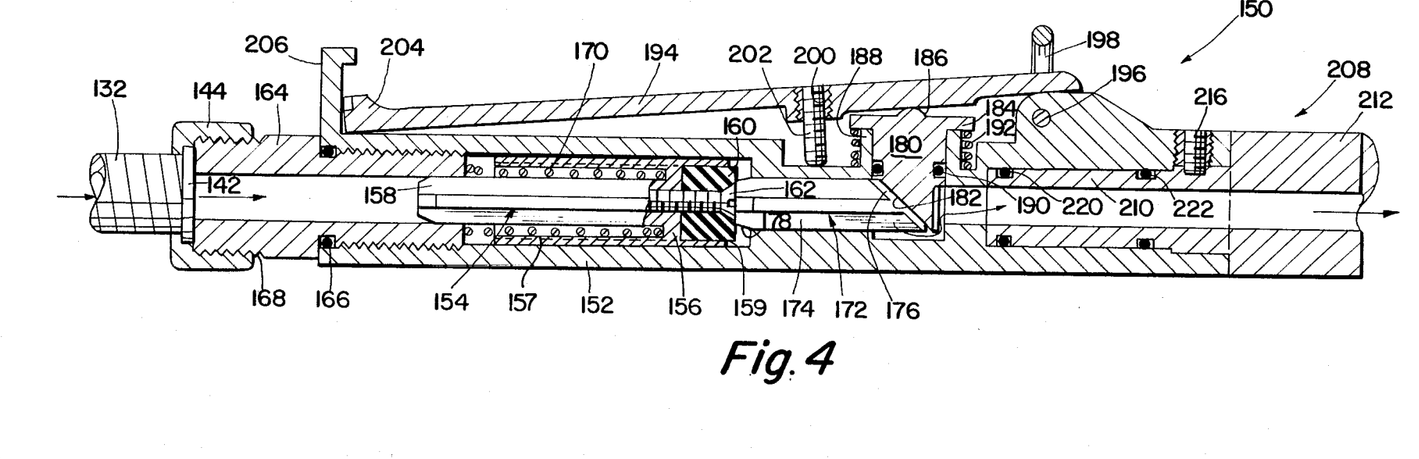
FIG. 4 is a view of the valve unit of FIG. 3, with an actuating lever moved to a valve-open condition.
Figure 5:
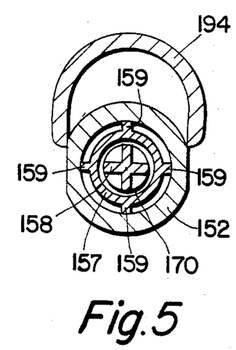
FIGS. 5, 6, 7 and 8 are views taken along planes indicated by lines 5—5, 6—6, 7—7, and 8—8, respectively, in FIG. 3.
Figure 6:
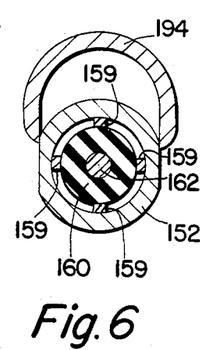
Figure 7:
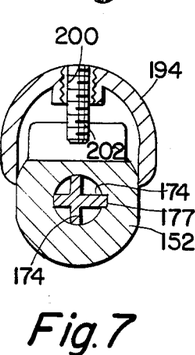
Figure 8:
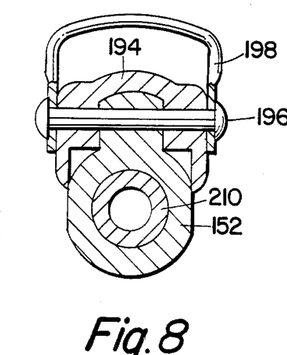

(5) In order to discharge a flow of water from the nozzle 208, the lever 194 must be depressed as indicated in FIG. 4. Upon depression of the lever 194, the piston 180 will be displaced against the bias of the spring 192. The beveled surfaces 176, 182 will slide relative to each other and the slide block 172 will be advanced to the left as viewed in FIG. 4. In turn, the piston 154 will be displaced against the pressure of the water and the spring 170 to a valve-open position (FIG. 4). Water then will be permitted to flow outwardly of the hand-held unit 150 through the nozzle 208.

Due to the mechanical advantage provided by the lever 194, it will be particularly easy for a user to modulate the flow of water through the hand-held valve unit 150. The unit 150 can be positioned in virtually any orientation and yet the user will be able to modulate the flow of water from a slow rate to a rapid rate as may be desired. By appropriate adjustment of the set screw 202, the maximum flow of water can be controlled. When it is desired to stop the flow of water, it is necessary only to release the lever 194 and the components will assume a valve-closed position as shown in FIG. 3. Because the piston 154 is seated only under the influence of water pressure and forces from the spring 170, it will be impossible for the sealing member 160 to be prematurely worn out due to the imposition of operator-applied forces. This feature of the invention is important in insuring that the components of the invention will be exceedingly long-lived.

ALTERNATIVE EMBODIMENT OF THE HAND HELD UNIT 150

Referring to FIGS. 9-16, alternative embodiments of the hand-held valve unit 150 are shown. The embodiments of FIGS. 9-14 are similar to each other in that a piston always is urged to a valve-closed position by water pressure and a piston-actuating member is acted upon by the lever 194 so as to urge the piston to a valve-open position against the influence of the water pressure. In each of the embodiments illustrated in FIGS. 9-14, it will be assumed that the body portion 152 and the lever 194 as shown in FIGS. 1-8 are used without substantial modification.

Figures 9, 10, 11, 12:
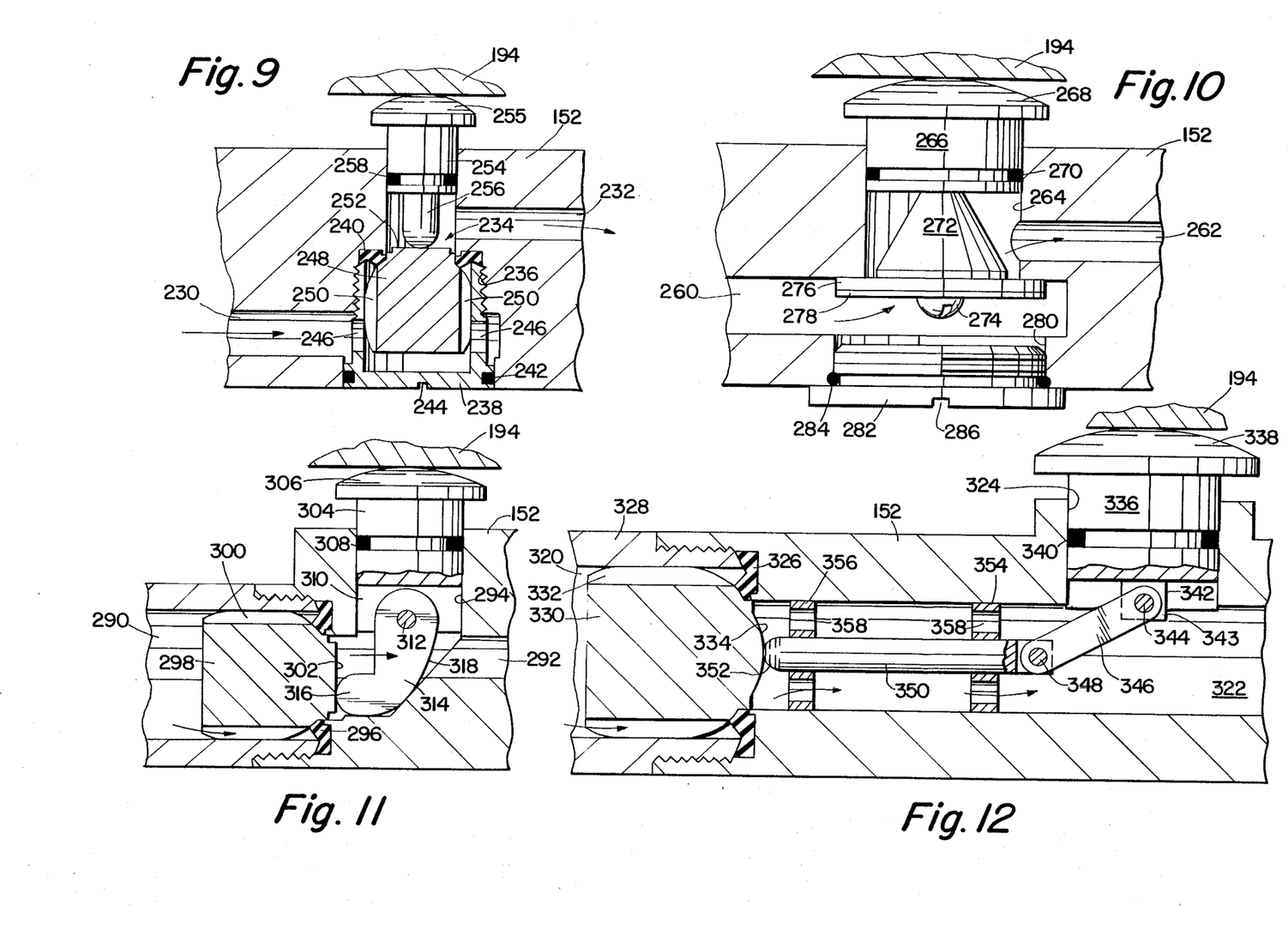
FIG. 9 is a cross-sectional view of a portion of a hand-held valve unit of an alternative embodiment of the invention.
FIGS. 10-16 are views similar to FIG. 9 of other alternative embodiments of the invention.

Referring to FIG. 9, the valve body 152 includes an inlet channel 230, an outlet channel 232, and a connecting region 234. The region 234 is threaded as at 236 to retain a threaded, hollow plug 238. An annular, elastomeric sealing member 240 is disposed within the region 234 and is held in place there by the end of the plug 238. An O-ring 242 is disposed about the plug 238 to establish a fluid-tight seal. A screwdriver slot 244 enables the plug 238 to be tightly threaded into place within the body member 152. The side of the plug 238 includes a plurality of openings 246 to establish fluid communication with the inlet 230. A piston 248 having a plurality of ribs 250 and a flattened end surface 252 is disposed within the plug 238. Under the influence of water pressure from the inlet 230 and the openings 246, the piston 248 always is urged to a valve closed position as shown in FIG. 9.

A second piston 254 is disposed within the region 234. The piston 254 includes a rounded upper end 255 for engagement with the underside of the lever 194, and a reduced diameter end 256 for engagement with the end surface 252 of the piston 248. An O-ring 258 establishes a fluid-tight seal for the piston 254 in the region 234.

As will be apparent from the examination of FIG. 9, upon depressing the lever 194, the piston 254 will urge the piston 248 away from the sealing member 240 and water will be permitted to flow through the outlet 232. Upon releasing the lever 194, water pressure will urge the piston 248 to a valve closed position, whereupon the flow of water through the outlet 232 will be stopped. As in the embodiment of the invention previously described, it is impossible for the sealing member 240 to be deformed by the application of operator-imposed forces, thereby insuring an exceedingly long life for the valve components.

Referring now to FIG. 10, the valve body 152 includes an inlet 260, an outlet 262, and a cylindrical opening 264 connecting the inlet 260 and the outlet 262. A piston 266 is disposed within the opening 264 and includes an enlarged end region 268 for engagement with the underside of the lever 194. An O-ring 270 establishes a fluid-tight seal between the piston 266 and the opening 264. A conical portion 272 projects from the end of the piston 266. An elastomeric washer 276 is clamped in place against the end of the portion 272 by a threaded fastener 274. A metal washer 278 adds structural integrity to the washer 276. As will be apparent from an examination of FIG. 10, the washer 276 is sized appropriately to establish a fluid-tight seal at the interface between the inlet 260 and the opening 264.

Access to the fastener 274 is provided by an opening 280 within which a threaded plug 282 is fitted. An O-ring 284 establishes a fluid-tight seal between the plug 282 and the opening 280. A slot 286 is provided for the plug 282 to enable the plug 282 to be tightly threaded into the opening 280.

As will be apparent from an examination of FIG. 10, upon depressing the lever 194, the sealing member 276 will be moved downwardly and water will be permitted to flow from the inlet 260 to the outlet 262. Upon releasing the lever 194, the piston 266 will be urged to that position shown in FIG. 10, whereupon the washer 276 will prevent further flow of water through the outlet 262.

Turning to FIG. 11, the body portion 152 includes an inlet 290, an outlet 292, and an opening 294 connecting the inlet 290 to the outlet 292. An annular, elastomeric sealing member 296 is disposed at the interface between the inlet 290 and the opening 294, and a piston 298 is disposed within the inlet 290 for engagement with the sealing member 296. The piston 298 includes a plurality of ribs 300 and an end face 302. A second piston 304 is disposed within the opening 294. The piston 304 includes a rounded end portion 306 for engagement with the underside of the lever 194, and an O-ring 308 establishes a fluid-tight seal between the piston 304 and the opening 294. A slot 310 is formed at the end of the piston 304 and includes a laterally extending pin 312. An arm 314 is secured to the pin 312 for pivotal movement. The arm 314 includes a rounded end portion 316 for engagement with the end surface 302 of the piston 298, and a smoothly contoured back surface 318.

Upon depressing the piston 304, the contoured surface 318 will be urged downwardly and the rounded end portion 316 will engage the end surface 302 so as to urge the piston 298 to the left in FIG. 11 against the force of water pressure. Water then will be permitted to flow from the inlet 290 to the outlet 292. When force is released on the piston 304, the piston 298 will be urged to a valve closed position as shown in FIG. 11, and the piston 304 will reassume that position shown in FIG. 11.

Referring now to FIG. 12, the body portion 152 includes an inlet 320, an outlet 322, and an opening 324 extending into the outlet 322. An annular, elastomeric sealing member 326 is positioned at the interface between the inlet 320 and the outlet 322 and is held in place there by a threaded retainer 328. A piston 330 having a plurality of ribs 332 and a rounded end 334 is disposed within the retainer 328 for axial movement therein. A piston 336 having a rounded upper end 338 for engagement with the underside of the lever 194 is disposed within the opening 324. An O-ring 340 provides a fluid-tight engagement between the piston 336 and the opening 324. A projection 342 having a slot 343 is formed at one end of the piston 336 and includes a laterally extending pin 344. A link 346 is secured to the pin 344 for pivotal movement.

The other end of the link 346 is pinned as at 348 to an actuating rod 350. The rod 350 includes a rounded end 352 for engagement with the rounded end 334 of the piston 330. The rod 350 is supported for axial movement within the outlet 322 by a pair of spaced supports 354, 356, each having a plurality of openings 358 therein.

Upon depressing the lever 194, the piston 336 is urged downwardly as viewed in FIG. 12, and, due to the transmission forces through the link 346 and the rod 350, the piston 330 is moved to the left as viewed in FIG. 12 to an open position. Water then can flow from the inlet 320 through the outlet 322. Upon releasing the lever 194, the components will reassume that position shown in FIG. 12 and the flow of water through the outlet 322 will be stopped.

Figure 13:
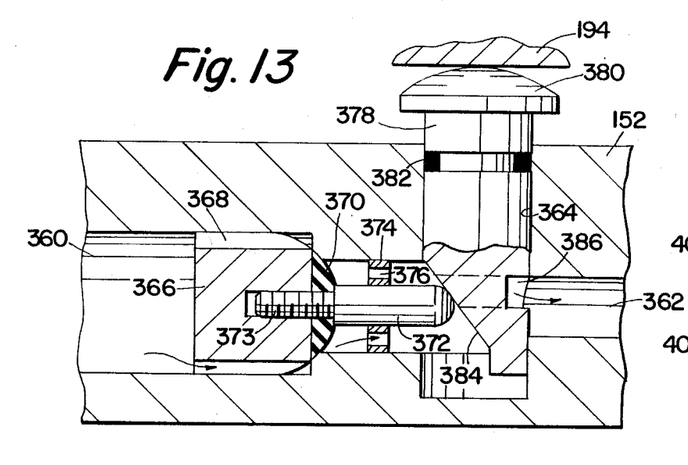

Referring to FIG. 13, the body portion 152 includes an inlet 360, an outlet 362, and an opening 364 in communication with the outlet 362. A piston 366 is disposed within the inlet 360 for axial movement therein. The piston 366 includes a plurality of ribs 368. An elastomeric sealing member 370 is secured to the end of the piston 366 for sealing engagement at the interface between the inlet 360 and the outlet 362. An elongate end portion 372 projects outwardly of the piston 366 and engages the body of the piston 366 by means of threads 373 to clamp the sealing member 370 against the end of the piston 366. A support 374 having a plurality of openings 376 is disposed within the outlet 362 so as to stabilize the end portion 372.

A piston 378 having a rounded end 380 for engagement with the underside of the lever 194 is disposed within the opening 364. An O-ring 382 establishes a fluid-tight seal between the piston 378 and the opening 364. The piston 378 includes a beveled surface 384 and an opening 386 for permitting water to flow through the outlet 362.

Upon depressing to the lever 194, the piston 378 will be moved downwardly as viewed in FIG. 13 and, due to the interaction of the beveled surface 384 and the end of the end portion 372, the piston 366 will be moved to the left as viewed in FIG. 13. The sealing member 370 thus will be moved to an open position and water will be permitted to flow from the inlet 360 to the outlet 362. Upon releasing the lever 194 the components will reassume that position shown in FIG. 13, whereupon a valve-closed position will be re-established.

Figure 14:
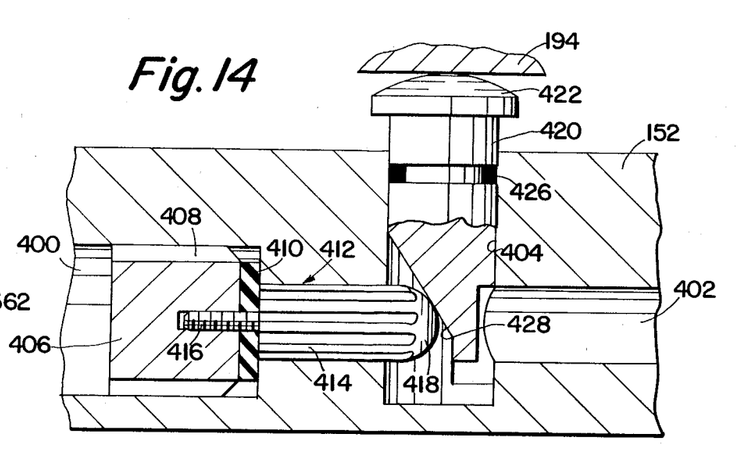

Turning now to FIG. 14, yet an additional embodiment of the invention is shown. The body portion 152 includes an inlet 400, an outlet 402, and an opening 404 extending into the outlet 402. A piston 406 having a plurality of ribs 408 is disposed within the inlet 400 for axial movement therein. A disc-like, elastomeric sealing member 410 is secured to the end of the piston 406 for sealing engagement at the interface between the inlet 400 and the outlet 402. An elongate projection 412 having a plurality of splines 414 extends from the end of the piston 406. The projection 412 includes a threaded portion 416 for securing the projection 412 to the piston 406 and clamping the sealing member 410 against the end of the piston 406. The projection 412 also includes a rounded end portion 418.

A second piston 420 having a rounded end portion 422 for engagement with the underside of the lever 194 is disposed within the opening 404. An O-ring 426 establishes a fluid-tight seal between the piston 420 and the opening 404. The lower portion of the piston 420, like the piston 378, includes a beveled surface 428 engageable with the rounded end 418 of the threaded projection 412.

Upon depressing the lever 194, the piston 420 will be moved downwardly as viewed in FIG. 14 and, due to the interaction of the beveled surface 428 and the rounded end 418, the piston 406 will be displaced to the left as viewed in FIG. 14. The sealing member 410 will be moved to an opened position, whereupon water will be permitted to flow from the inlet 400 to the outlet 402. Upon releasing the lever 194, the components will reassume that position shown in FIG. 14, whereupon a valve-closed position will be reestablished.

Figure 15:
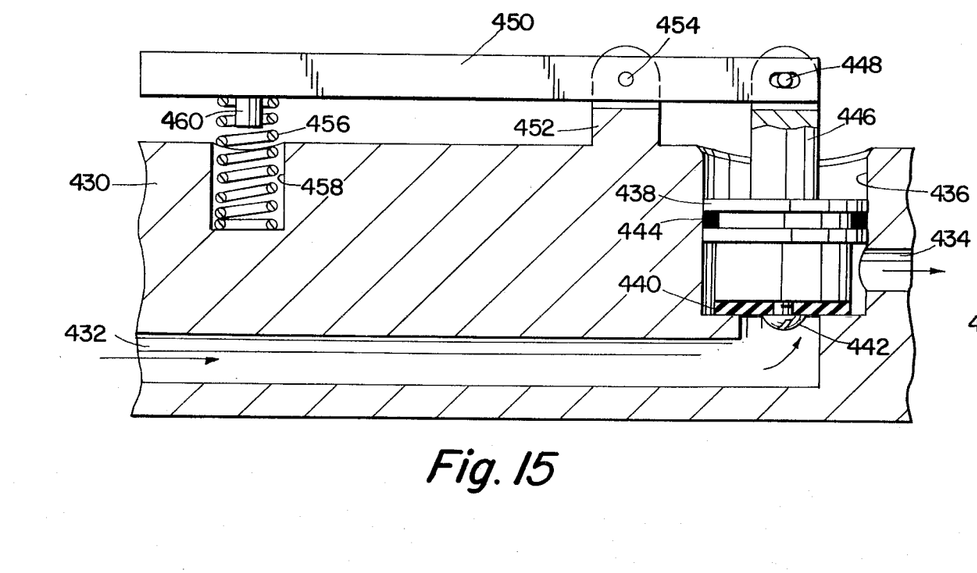

Turning now to FIG. 15, yet an additional embodiment of the invention is shown. This embodiment of the invention differs from the embodiments shown in FIGS. 9–14 in that water pressure constantly urges a valving member to a valve-open position, rather than to a valve-closed position. In FIG. 15, a body portion 430 is employed, rather than the body portion 152. The body portion 430 includes an inlet 432, an outlet 434, and an opening 436 disposed between the inlet 432 and the outlet 434. A piston 438 is disposed within the opening 436 and includes a disc-like, elastomeric sealing member 440 at one end in sealing engagement with that portion of the body portion 430 adjacent the inlet 432. The sealing member 440 is held in place by means of a threaded fastener 442. An O-ring 444 establishes a fluid-tight seal between the piston 438 and the opening 436. A projection 446 extends from a central portion of the piston 438 and includes a pin 448 near its end for attachment of a lever 450. The body portion 430 includes a boss 452 having a pin 454 for securing the lever 450 for pivotal movement. The other end of the lever 450 is biased to a clockwise position as shown in FIG. 15 by a spring 456. The spring 456 is disposed within an opening 458 formed in the body portion 430 and is held in place on the underside of the lever 450 by a small projection 460.

Upon pivoting the lever 450 counter-clockwise as viewed in FIG. 15, the lever 450 will compress the spring 456 and, at the same time, will displace the piston 438 upwardly. The sealing member 440 will be moved to an open position and water will be permitted to flow from the inlet 432 to the outlet 434. Upon releasing force from the lever 450, the spring 456 will pivot the lever 450 as viewed in FIG. 15 and will re-establish a seal to shut off the flow of water through the outlet 434. In this embodiment of the invention, because the piston is not biased to a valve-closed position, the strength of the spring 456 must be selected carefully so that excessive force is not applied to the sealing member 440, thereby causing it to be deformed. At the same time, the spring 456 must be strong enough to positively establish a valve-closed position, regardless of the water pressure that may be encountered. In general, the embodiment of FIG. 15 is less desirable than the previously described embodiments.

Figure 16:
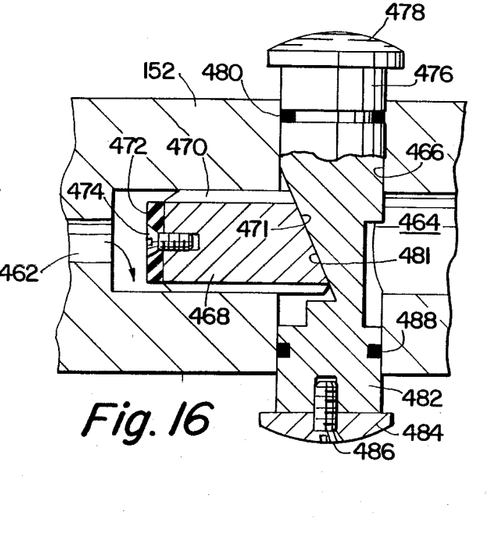

Yet another embodiment of the invention is illustrated in FIG. 16. The body portion 152 includes an inlet 462, an outlet 464, and an opening 466 in communication with the outlet 464. The opening 466 extends completely through the body portion 152. A piston 468 having a plurality of ribs 470 and a beveled end surface 471 is disposed within the outlet 464 for axial movement therein. A disc-like, elastomeric sealing member 472 is secured to the end of the piston 468 by means of a threaded fastener 474.

A piston 476 having a rounded end portion 478 is disposed within the opening 466. An O-ring 480 establishes a fluid-tight seal between the piston 476 and the opening 466. The piston 476 includes a beveled lower portion 481 engageable with the beveled end surface 471 of the piston 468. The piston 476 also includes a second portion 482 disposed within the opening 466. A rounded end portion 484 is secured to the second portion 482 by means of a threaded fastener 486. An O-ring 488 establishes a fluid-tight seal between the portion 482 and the opening 466.

The embodiment of the invention illustrated in FIG. 16 is not biased to a valve-open position or to a valve-closed position. Rather, the piston 476 must be positively displaced in order to effect a valving function. Upon applying a downward force to the piston 476 as viewed in FIG. 16, the piston 468 will be urged to the left due to the engagement between the beveled surfaces 481, 471. If the piston 476 is displaced far enough, the sealing member 472 eventually will seat against the bottom of the outlet 464 and establish a valve-closed condition. If the portion 482 is pushed upwardly as viewed in FIG. 16, the relative motion of the beveled surfaces 471, 481, coupled with the pressure of the water against the sealing member 472, will displace the piston 468 to that position shown in FIG. 16, whereupon a valve-open condition will be established. The rate of water flow desired by the user can be adjusted simply by controlling the position of the piston 476 within the opening 466.

AN ADDITIONAL ALTERNATIVE EMBODIMENT

Figure 19:
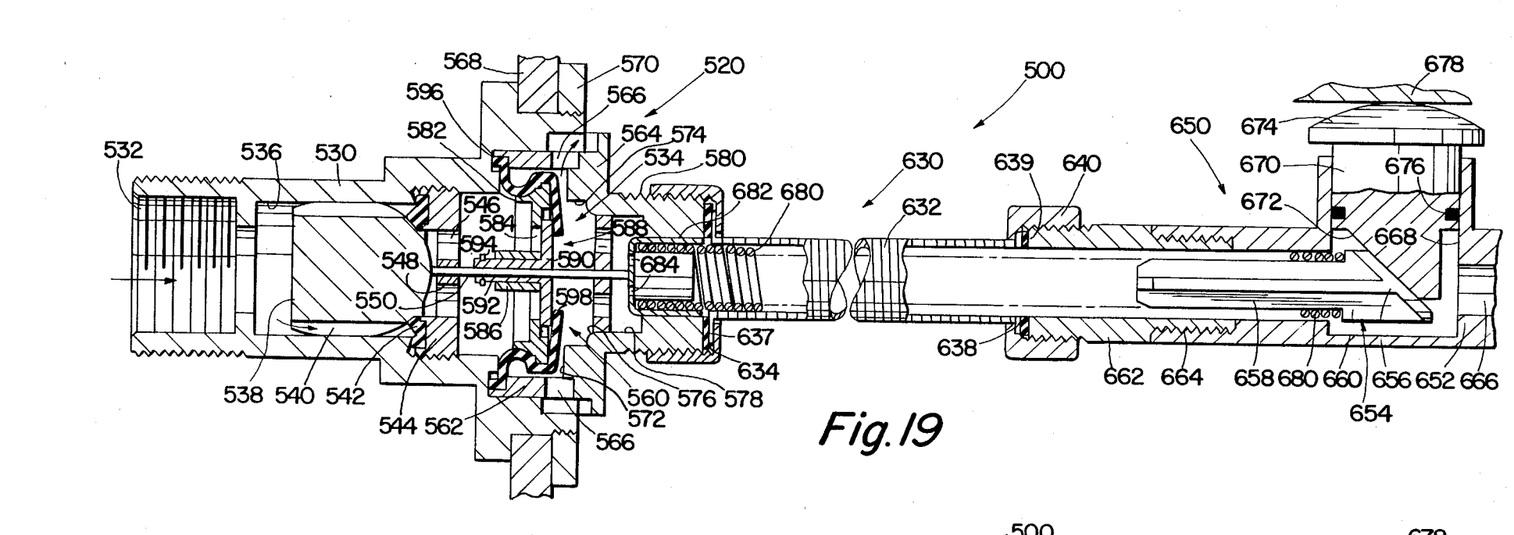
FIGS. 19 and 20 are cross-sectional views of an alternative embodiment of the invention showing a wall-mounted valve actuated by a control member extending from a hand-held unit, the components being illustrated in, respectively, a valve-closed and a valve-open position.
Figure 20:
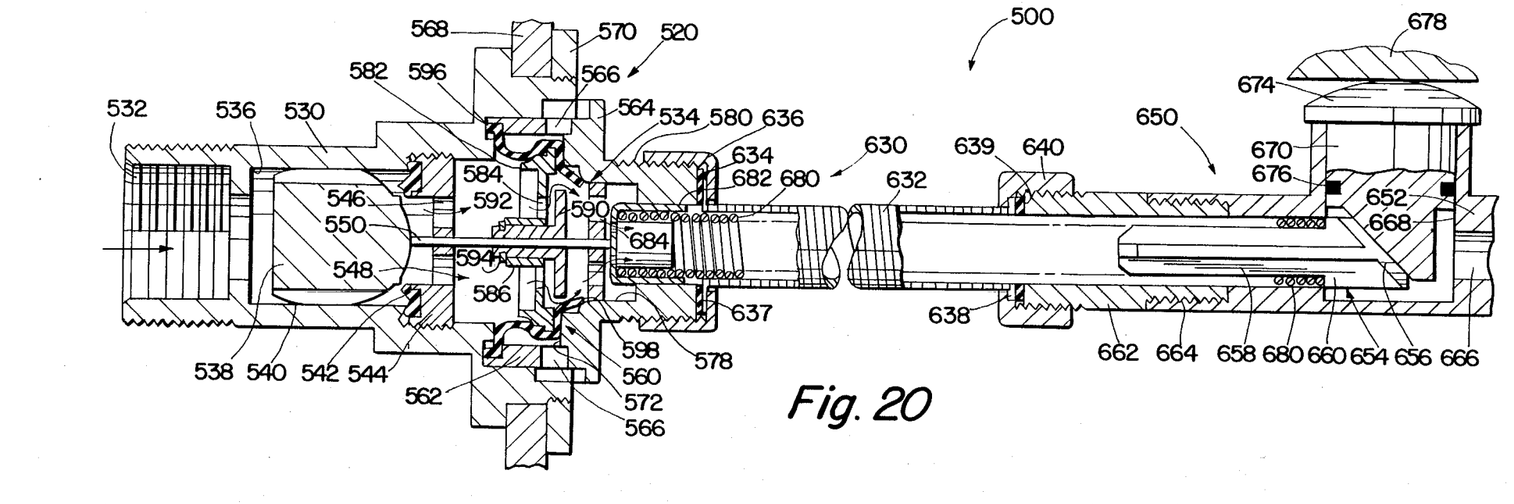

Referring now to FIGS. 19 and 20, an additional alternative embodiment of the invention is shown. In this embodiment of the invention, an ablution valve is indicated generally by the reference numeral 500. The valve 500 includes a wall-mounted control valve 520, a flexible hose 630 for conducting water, and a hand-held unit 650 for controlling the discharge of water from the hose 630 and for directing the flow of water for hygienic purposes. Certain features of the valve 500 as were illustrated with the faucet 10 have been omitted in FIGS. 19 and 20 for purposes of clarity. Such features include a hook for securing the unit 650 to the wall 22 and certain exterior features of the hand-held unit 650.

The valve 520 includes a body portion 530 formed of a one-piece brass casting. The body portion 530 includes an inlet indicated generally by the reference numeral 532 for connection to the branch line 26 (FIG. 1), and an outlet indicated generally by the reference numeral 534. The inlet 532 includes a cylindrical portion 536. A piston 538 having a plurality of ribs 540 is disposed within the cylindrical portion 536 for axial movement therein. An annular, elastomeric sealing member 542 is disposed within the body portion 530 and is clamped in place there by a retainer 544. The retainer 544 includes a plurality of openings 546 for the passage of water. The retainer 544 also includes a central portion 548 through which an actuating rod 550 extends.

A vacuum breaker 560 is positioned in the fluid outlet 534. A cylindrical insert 562 is positioned within the outlet 534 and a fitting 564 is secured to the body portion 530. The fitting 564 defines a portion of the fluid outlet 534. Outlet ports 566 formed in the insert 562 are in communication with the fluid outlet 534 when the vacuum breaker 560 is in a valve-closed position. The ports 566 therefore permit the fluid outlet 534 to communicate with the atmosphere upon the occurrence of a vacuum condition existing in the fluid supply or whenever the valve 520 is closed.

The body portion 530 is attached to a mounting plate 568 by means of a nut 570. The plate 568, in turn, may be secured to the wall 22 in any conventional fashion. In a manner similar to the housing 44, the fitting 564 is secured to the body portion 530 and includes a flat, annular end face 572, a cylindrical bore 574, a tapered shoulder 576, and a cylindrical bore 578 smaller in diameter than the bore 574. The outer portion of the fitting 564 is threaded as at 580.

A spider 582 having openings 584 and a cylindrical projection 586 located at its center is disposed within the insert 562. A valving member 588 in the form of a disc 590 having a stem 592 is carried by the spider 582. The stem 592 fits within the projection 586 and is retained in place by a snap ring 594. The stem 592 is hollow and is adapted to receive, and move relative to, the actuating rod 550. Depending on the position of the disc 590 relative to the openings 584, the valving member 588 either will permit fluid to flow outwardly through the fluid outlet 534 (FIG. 20), or will close off the openings 584 and will prevent the flow of fluid (FIG. 19).

A cylindrical, elastomeric boot 596 is held in place within the body portion 530 by the insert 562. The spider 582 and the valving member 588 are disposed within, and are constrained by, the boot 596. The boot 596 includes a small opening 598 adjacent the disc 590. When water is not flowing through the passageway 532 (as when the valve 520 is closed or a vacuum condition exists in the water supply), the boot 596 urges the valving member 588 and the spider 582 to the left as viewed in FIG. 19 to a closed position. When water is flowing through the passageway 532, the pressure of the water urges the valving member 588 and the spider 582 to the right as viewed in FIG. 20. In the position shown in FIG. 20, the spider 582 has clamped the boot 596 against the end face 572 so as to provide a fluid-tight seal. The pressure of the water urges the disc 590 away from the openings 584 and, due to the flexibility of the boot 596 adjacent the opening 598, water can flow around the disc 590, past the shoulder 576, and outwardly through the fluid outlet 534.

The hose 630 includes a flexible section 632 which, like the flexible section 132, may be formed of a plastics material, rubber, or any other suitable substance as is well known. Because it is expected that relatively high axial loads will be imposed upon the flexible section 632, reinforcement in the form of internally disposed strands of fabric or metal are desirable. One end of the hose 630 is provided with a flange 634 for connection to the fitting 564. A nut 636 is fitted over the flexible section 632 and engages the flange 634 and a washer 637 to secure the flexible section 632 against the end of the fitting 564. The other end of the flexible section 632 includes a flange 638. The flange 638 and a washer 639 are engaged by a nut 640 to secure the flexible section 632 against the end of the handheld unit 650.

The hand-held valve unit 650 includes an elongate, generally cylindrical body portion 652. Preferably, the body portion 652 as with the other components of the unit 650, is formed from a readily moldable plastics material such as that sold under the trademark CELCON. A piston 654 is disposed within the body portion 652. The piston 654 includes a disc-like head 656 inclined at an angle to its longitudinal axis and a plurality of axially extending ribs 658 having enlarged portions 660. The piston 654 extends "upstream" so that the back face of the head 656 is exposed to water pressure from the hose 630. A fitting 662 is secured to the end of the body portion 652 as by threads indicated at 664. A portion of the piston 654 extends within the fitting 662. The nut 640 is threadedly secured to the outer end portion of the fitting 662 as has been described already.

The body portion 652 includes an outlet 666. The outlet 666 is in fluid communication with components substantially identical to the nozzle 208 as has been described previously with the first-mentioned embodiment of the invention. An opening 668 is formed in the body portion 652 at the entrance to the opening 666.

In order to actuate the piston 654, a second piston 670 (oriented vertically in FIGS. 19 and 20) is provided. The piston 670 includes a beveled end surface 672 engageable with the head 656 of the piston 654. The piston 670 also includes a rounded upper portion 674. An O-ring 676 is provided for the piston 670 to establish a fluid-tight seal between the piston 670 and the opening 668. A lever 678, in a manner similar to the lever 194, is provided to actuate the second piston 670.

With this embodiment of the invention, the piston 654 does not provide a sealing function. Rather, such a sealing function is provided entirely by the valve 520. In order to actuate the valve 520, a flexible, elongate, hollow cable or tightly wound helical wire 680 is provided. The cable 680 is in engagement at one end with the back face of the head 656 of the piston 654. The other end of the cable 680 is received in a cup-like receptacle 682 secured to the end of the rod 550. A plurality of openings 684 are formed in the base of the cup-like receptacle 682 to enable water to flow from the fluid outlet 534 into the interior of the cable 680. The outer diameter of the cup-like receptacle 682 is closely fitted within the inner diameter of the fitting 564 so as to provide good support for the receptacle 682 while, at the same time, maintaining a reasonably fluid-tight interface.

OPERATION

This alternative embodiment of the invention is operated as follows:

(1) The hand-held unit 650 is removed from the hook 28 and is oriented as desired.

(2) Upon squeezing the lever 678, the piston 670 is moved downwardly as viewed in FIGS. 19 and 20 and the beveled surfaces 656, 672 will slide relative to each other and the piston 654 will be advanced to the left as viewed in FIG. 19.

(3) As the piston 654 is advanced to the left as viewed in FIG. 19, the cable 680 also will be moved to the left and will displace the actuating rod 550. In turn, the piston 538 will be unseated from the sealing member 542. A flow of water will be established through the valve 520, through the flexible section 632, into the hand-held unit 650, past the piston 654, and through the outlet 666.

(4) Upon releasing the lever 678, water pressure will urge the piston 538 into a closed position as shown in FIG. 19. The flow of water through the valve 520 and, hence, the hose 630 will be stopped. Because water flow is controlled entirely by the valve 520, it is impossible for high water pressure (or any water pressure at all) to be maintained in the hose 630 and the hand-held unit 650 under conditions of non-use. Accordingly, it is impossible for the flexible section 632 to burst due to inadvertent failure to shut off the valve 520.

The invention provides a comfortable hand-held hygienic device in which the flow of water is very easy to modulate. The wall-mounted shut-off valve is effective in preventing leaks and, particularly when used with the alternative embodiment of the invention, insures that water pressure cannot be maintained in the hose during periods of non-use. The inclusion of a vacuum breaker in the wall-mounted shut-off valve ensures that water cannot be drawn reversely through the hand-held unit and into the water supply system.

Although the invention has been described in its preferred form with a certain degree of particularity, it will be understood that the present disclosure of the preferred embodiment has been made only by way of example and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. In a hand-held unit for dispensing water for hygienic purposes, the combination comprising:
   a body portion;
   a water inlet for the body portion;
   a nozzle extending outwardly of the body portion, the nozzle adapted to receive water transmitted through the body portion from the inlet and to discharge the water as may be directed by the user;
   a valve element disposed within the body portion, the valve element oriented with respect to the flow of water so as to always be urged into engagement with a valve seat by water pressure;
   a valve element-actuating member disposed at least partially within the body portion and in engagement with the valve element, the valve element-actuating member including a first piston movable generally perpendicular to the centerline of the body portion and a slide block in engagement with both the valve element and the piston, the slide block being disposed within the body portion;
   means for orienting the slide block in a predetermined position relative to the body portion, said means including a plurality of ribs extending outwardly of the slide block, one of the ribs being configured differently than the others, and a groove formed in the body portion adapted to receive in sliding relationship the rib configured differently than the other ribs; and
   a control for the valve element-actuating member extending outwardly of the body portion, the control connected to the body portion such that the control moves generally perpendicular to the centerline of the body portion, actuation of the control causing the valve element to be axially displaced toward or away from the valve seat.

2. In a hand-held unit for dispensing water for hygienic purposes, the combination comprising:
   a body portion;
   a water inlet for the body portion;
   a nozzle extending outwardly of the body portion, the nozzle adapted to receive water transmitted through the body portion from the inlet and to discharge the water as may be directed by the user;
   a valve element in the form of a first piston disposed within the body portion, the first piston including a head oriented with respect to the flow of water so as to always be urged into engagement with a valve seat by water pressure, the first piston also including a plurality of outwardly extending ribs, the ribs being in contact with an interior portion of the body portion, the ribs defining flow passages therebetween through which water can flow;
   a valve element-actuating member disposed at least partially within the body portion and in engagement with the valve element, the valve element-actuating member including a second piston movable generally perpendicular to the centerline of the body portion and a slide block in engagement with both the valve element and the second piston; and
   a control for the valve element-actuating member extending outwardly of the body portion, the control connected to the body portion such that the control moves generally perpendicular to the centerline of the body portion, actuation of the control causing the valve element to be axially displaced toward or away from the valve seat.

3. The unit of claim 2, wherein the first piston is held within the body portion by a fitting disposed at one end of the body portion.

4. The unit of claim 3, further including a spring disposed intermediate the first piston and the fitting, the spring always biasing the first piston toward a valve-closed position.

5. Apparatus for dispensing water for hygienic purposes, the combination comprising;
   (a) a body portion;
   (b) a water inlet for the body portion;
   (c) a nozzle extending outwardly of the body portion, the nozzle adapted to receive water transmitted through the body portion from the inlet and to discharge the water as may be directed by the user;
   (d) a valve element disposed within the body portion, the valve element oriented with respect to the flow of water so as to always be urged into engagement with a valve seat by water pressure;
   (e) a control for the valve element extending outwardly of the body portion, the control connected to the body portion such that the control moves generally perpendicular to the centerline of the body portion, actuation of the control causing the valve element to be axially displaced toward and away from the valve seat;
   (f) a wall-mounted control valve and a hose in fluid communication with the wall-mounted control valve and the body portion; and
   (g) a vacuum breaker included as part of the wall-mounted control valve, the vacuum breaker including:
      (i) an annular, elastomeric boot disposed within the control valve to prevent a flow of water outwardly of the vacuum breaker during conditions of normal use and to prevent a flow of water reversely into the control valve during conditions of a vacuum in the water supply, the boot also enabling atmospheric pressure to break a vacuum in the water supply;
      (ii) a primary piston disposed concentrically within the boot and axially movable relative thereto, the primary piston having a plurality of through openings; and
      (iii) a secondary piston connected to the primary piston and movable relative thereto, the secondary piston covering the openings in the primary piston to prevent a reverse flow of water under conditions of a vacuum and whenever waterflow through the valve is stopped, and uncovering the openings in the primary piston and permitting water to flow through the primary piston and the boot and outwardly into the hose under conditions of positive water pressure.

6. An ablution faucet, comprising:

(a) a hand-held spray unit for dispensing water, the hand-held unit including:
  (i) a body portion;
  (ii) a water inlet for the body portion;
  (iii) a nozzle extending outwardly of the body portion, the nozzle adapted to receive water transmitted through the body portion from the inlet and to discharge the water as may be directed by the user;
  (iv) a valve element disposed within the body portion, the valve element oriented with respect to the flow of water so as to always be urged into engagement with a valve seat by water pressure; and
  (v) a control for the valve element extending outwardly of the body portion, the control being positioned relative to the body portion such that the control moves generally perpendicular to the centerline of the body portion, actuation of the control causing the valve element to be axially displaced toward and away from the valve seat;
(b) a hose in fluid communication with the hand-held spray unit;
(c) a wall-mounted control valve from which the hose extends, the wall-mounted control valve including:
  (i) a valve element always biased toward a closed position by water pressure;
  (ii) a valve element actuator for displacing the valve element against the flow of water; and
  (iii) a handle extending outwardly of the control valve for controlling the actuator and, hence, the valve element; and
(d) a vacuum breaker included as part of the wall-mounted control valve, the vacuum breaker including:
  (i) an annular, elastomeric boot disposed within the control valve to prevent a flow of water outwardly of the vacuum breaker during conditions of normal use and to prevent a flow of water reversely into the control valve during conditions of a vacuum in the water supply, the boot also enabling atmospheric pressure to break a vacuum in the water supply;
  (ii) a primary piston disposed concentrically within the boot and axially movable relative thereto, the primary piston having a plurality of through openings; and
  (iii) a secondary piston connected to the primary piston and movable relative thereto, the secondary piston covering the openings in the primary piston to prevent a reverse flow of water under conditions of a vacuum and whenever waterflow through the valve is stopped, and uncovering the openings in the primary piston and permitting water to flow through the primary piston and the boot and outwardly into the hose under conditions of positive water pressure.

7. The ablution faucet of claim 6, wherein:
(a) the valve element of the hand-held unit is an elongate piston, the piston including a head engageable with the valve seat;
(b) the control for the hand-held unit includes a lever secured to an outer portion of the body portion, and a piston-actuating member is disposed intermediate the lever and the piston;
(c) the piston-actuating member includes a beveled face and the piston includes a beveled face, the beveled faces engaging each other in a sliding relationship;
(d) a spring is disposed intermediate the piston actuating member and a stationary portion of the body portion, the spring always biasing the piston-actuating member to a position where the flow of water is stopped and,
(e) a spring is disposed intermediate the piston and a stationary portion of the body portion, the spring always biasing the piston toward a valve-closed position.

* * * * *